United States Patent
Vaissiere et al.

(10) Patent No.: US 11,656,170 B2
(45) Date of Patent: May 23, 2023

(54) SYSTEM FOR AND METHOD OF MONITORING A CONDITION OF AT LEAST ONE OBJECT COMPRISED IN A PIPING SYSTEM

(71) Applicant: Endress+Hauser Group Services AG, Reinach (CH)

(72) Inventors: Dimitri Vaissiere, Rixheim (FR); Dirk Dohse, Freiburg (DE)

(73) Assignee: Endress+Hauser Group Services AG, Reinach (CH)

( * ) Notice: Subject to any disclaimer, the term of this patent is extended or adjusted under 35 U.S.C. 154(b) by 203 days.

(21) Appl. No.: 17/126,208

(22) Filed: Dec. 18, 2020

(65) Prior Publication Data

US 2021/0190673 A1 Jun. 24, 2021

(30) Foreign Application Priority Data

Dec. 19, 2019 (DE) ...................... 10 2019 135 288.6

(51) Int. Cl.
*G01N 17/04* (2006.01)
*G01H 13/00* (2006.01)
*G01N 11/16* (2006.01)

(52) U.S. Cl.
CPC ............. *G01N 17/04* (2013.01); *G01H 13/00* (2013.01); *G01N 11/16* (2013.01)

(58) Field of Classification Search
CPC ...... G01N 17/04; G01N 11/168; G01N 11/16; G01N 2291/0258; G01N 2291/0427; G01N 29/036; G01N 29/043; G01N 29/12; G01N 29/326; G01N 29/4436; G01H 13/00

See application file for complete search history.

(56) References Cited

U.S. PATENT DOCUMENTS 7,191,638 B2 * 3/2007 Lopatin ............... G01F 23/2968
                                                            73/61.49
7,665,357 B2    2/2010 Mueller et al.
                         (Continued)

FOREIGN PATENT DOCUMENTS

DE          2632632 A1     1/1978
DE     102017102550 A1 *   8/2018   ............. G01F 23/28
                         (Continued)

*Primary Examiner* — Alvaro E Fortich
*Assistant Examiner* — Dilara Sultana
(74) *Attorney, Agent, or Firm* — Mark A. Logan; Endress+Hauser (USA) Holding, Inc.

(57) ABSTRACT

Disclosed is a method of monitoring a condition of objects in a piping system in which each object has a surface exposed to a product flowing through a pipe in the piping system. The method allows for the condition of each object to be monitored whilst the object remains in place. The method includes repeatedly measuring a resonance frequency of an oscillatory element of a vibratory device that is installed in the pipe and that exhibits a susceptibility to an impairment caused by accretion, abrasion, and/or corrosion corresponding to the respective susceptibilities of the objects. The resonance frequency of the vibratory device is reduced by accretion and increased by corrosion and by abrasion of its oscillatory element. The method further includes monitoring the condition of the objects based on the measured frequencies.

20 Claims, 4 Drawing Sheets

(56) References Cited

U.S. PATENT DOCUMENTS

| | | | |
|---|---|---|---|
| 8,756,980 B2* | 6/2014 | D' Angelico et al. | ........................ G01F 23/2967 73/54.41 |
| 2006/0037399 A1 | 2/2006 | Brown | |
| 2007/0199379 A1* | 8/2007 | Wolf | ...................... G01N 17/04 73/590 |
| 2015/0106036 A1* | 4/2015 | Kumaran | ............... G01N 19/00 324/700 |
| 2015/0153208 A1* | 6/2015 | Arnold | ...................... G01F 1/68 73/204.11 |
| 2019/0064096 A1 | 2/2019 | Sharma et al. | |

FOREIGN PATENT DOCUMENTS

| | | |
|---|---|---|
| DE | 102017102550 A1 | 8/2018 |
| WO | 2019236897 A1 | 12/2019 |

\* cited by examiner

SYSTEM FOR AND METHOD OF MONITORING A CONDITION OF AT LEAST ONE OBJECT COMPRISED IN A PIPING SYSTEM

CROSS-REFERENCE TO RELATED APPLICATION

The present application is related to and claims the priority benefit of German Patent Application No. 10 2019 135 288.6, filed on Dec. 19, 2019, the entire contents of which are incorporated herein by reference.

TECHNICAL FIELD

The present disclosure concerns a system for and a method of, in particular a computer implemented method of, monitoring a condition of at least one object comprised in a piping system for transporting at least one product, wherein: said piping system comprises a pipe transporting said product(s), each object comprises at least one surface exposed to said product(s) flowing through said pipe, due to said exposure of said surface(s) to said product(s) each object is susceptible to an impairment caused by at least one of: accretion, abrasion and/or corrosion, and said piping system is operable in a first mode, wherein said pipe is filled with a first medium.

BACKGROUND

Piping systems comprising at least one pipe are used in various types of industry, like e.g. the food industry, the chemical industry and the oil- and gas industry, to transport products, like e.g. fluids of various kinds, from one location to another.

These piping systems comprise at least one object, like e.g. an inside wall of the pipe, having a surface, that is exposed to the product(s) flowing through the pipe. Due to the exposure of their surfaces to the product(s), these objects are susceptible to impairments caused by at least one of: accretion, abrasion and/or corrosion. The size of the susceptibility depends on the type of product(s) transported through the pipe and the properties, e.g. the material, of the exposed surface(s). Accretion is caused by deposits of products having a tendency to adhere or stick to the exposed surface(s). As an example an accretion layer building up on the inside wall of the pipe will reduce an inner diameter of the pipe and thus increase the flow resistance of the pipe. In the long run, a continuously increasing thickness of the accretion layer may even cause a blockage of the pipe. As a countermeasure, pipes susceptible to accretion are cleaned at regular intervals. Abrasion is caused by abrasive products flowing through the pipe, like e.g. products comprising sand or other abrasive particles. Surface corrosion is caused by corrosive products corroding the inside wall of the pipe, like e.g. salty or acidic liquids. In the long run abrasion, as well as corrosion will reduce a wall thickness of the pipe and thus reduce the mechanical stability of the pipe. As a countermeasure, pipes having inside walls susceptible to corrosion and/or abrasion are usually replaced at regular intervals. Regular cleaning or replacements of pipes cause costs and usually require an interruption of a process performed on a site comprising the piping system.

Since a visual inspection of the inside wall of a pipe is usually not possible during operation of the piping system the intervals between consecutive cleanings or replacements are usually kept so short, that safe operation of the piping system is ensured under all circumstances. In consequence, they are quite often performed long before they are really required due to the true condition of the pipe. On the other hand applying longer time intervals could cause cleanings or replacements to be performed too late. This may have severe consequences regarding safety as well as operability of the piping system, which in turn could cause harm to people and/or the environment, high additional costs and/or extended downtimes of the piping system. Thus, there is a need in industry to monitor the condition of the inside walls of these pipes during operation of the piping system, in order to optimize the time intervals in-between consecutive cleanings or replacements.

Accretion, as well as corrosion is also a problem with respect to vibratory devices for monitoring and/or determining a process variable of a medium, like e.g. level-limit switches for monitoring a fill level of the medium exceeding or falling below a predetermined level. Devices of this type are e.g. sold by the Endress+Hauser Group. Vibratory devices usually comprise an oscillatory element, a transducer causing the oscillatory element to oscillate, and a measurement unit measuring a frequency of the resulting oscillation. During operation, these vibratory devices are usually installed such that the frequency depends on the process variable to be measured or monitored. Accretion caused by deposits of the medium on the oscillatory element enhances the oscillating mass and thus reduces the frequency. Corrosion of the oscillatory element reduces the oscillating mass and thus increase the frequency. Any change of the oscillating mass that is not caused by a corresponding change of the process variable to be measured or monitored, impairs the capability of the vibratory device to monitor and/or to determine the process variable. This problem is e.g. addressed in U.S. Pat. No. 7,665,357 B2 describing a vibratory device designed to issue an accretion alarm, when the oscillation frequency of the oscillatory element falls below an adjustable limit determined based on dependencies of the oscillation frequency on process conditions and/or the process variable to be monitored and/or determined. Further, DE 10 2017 102 550 A1 describes a method of detecting corrosion or accretion of an oscillatory element of a vibratory device, wherein the oscillatory element is caused to oscillate at a resonance frequency and corrosion or accretion is detected based on the resonance frequency.

US 2019/0064096 A1 describes a system for detecting and locating corrosion on an outer surface of a metal pipe. The system comprises an electromagnetic wave guide arranged adjacent to the outer surface of the metal pipe. This wave guide comprises a sacrificial component experiencing substantially the same environment as the outer surface of the metal pipe. The system further comprises a waveform generator injecting an electromagnetic waveform into the wave guide and a wave form analyzer receiving a reflected portion of this waveform and determining the location of corrosion of the sacrificial component based on the reflected portion of the injected waveform. Even though this method may be well suited to detect corrosion occurring on the outside of the pipe, it is not designed to detect accretion nor impairments occurring on the inside wall of the pipe.

Impairments caused by accretion, abrasion and/or corrosion are not only a problem with respect to inside walls of pipes, but even more so with respect to other objects, like e.g. valves, thermowells, pumps, compensators or aggregates, having surfaces exposed to the product(s) flowing through pipes of piping systems. Thus, they need to be regularly cleaned and/or replaced to ensure safe operation of the piping system. Just like the condition of the inside walls of the pipes, the condition of these objects often cannot be determined without special testing procedures or, as a worst case, without removing the respective object from piping system.

SUMMARY

Thus, it is an object of the present disclosure to provide a monitoring system for and a method of monitoring a condition of at least one object comprised in a piping system, that allows for the condition of the object to be monitored whilst the object remains in place at the piping system and preferably also without causing any disturbance to the operation of the piping system.

This object is achieved by a method, in particular a computer implemented method, of monitoring a condition of at least one object comprised in a piping system for transporting at least one product, wherein: said piping system comprises a pipe transporting said product(s), each object comprises at least one surface exposed to said product(s) flowing through said pipe, due to said exposure of said surface(s) to said product(s) each object is susceptible to an impairment caused by at least one of: accretion, abrasion and/or corrosion, and said piping system is operable in a first mode, wherein said pipe is filled with a first medium, said method comprising the steps of:

1) continuously or repeatedly measuring a resonance frequency of an oscillatory element of a vibratory device installed on said pipe, wherein:

said oscillatory element extends into said pipe and exhibits a susceptibility to an impairment caused by accretion, abrasion and/or corrosion corresponding to the respective susceptibilities of said object(s), said vibratory device comprises a transducer causing said oscillatory element to oscillate at said resonance frequency and a measurement unit measuring said resonance frequency, and said resonance frequency is reduced by accretion and increased by corrosion and by abrasion of said oscillatory element, and 2) monitoring said condition of said object(s) based on said measured frequencies measured during at least one first time interval, during which said piping system was operated in said first mode and said oscillatory element was immersed in said first medium and determining and providing at least one monitoring result.

According to the present disclosure the condition of each object is monitored based on the condition of the oscillatory element exposed to the same product(s) determined based on the measured frequencies measured during the first intervals. This has the advantage that the condition of the object(s) can be monitored and impairments of the object(s) be detected at very early stage whilst each object remains in place at the piping system.

Further countermeasures, like e.g. a cleaning of the surface(s) of the object(s) required to remove or at least reduce accretion layers that may have built up on them, or replacements of the object(s) required due to abrasion or corrosion can be scheduled according to the true condition of the object(s). This not only enhances the safety of operation of the object(s) as well as of the entire piping system, but also allows for the cost, the time and possibly also downtimes of the piping system involved in the performance of these countermeasures to be reduced to a minimum required to ensure safe operation.

A first refinement comprises a method, wherein said monitoring performed based on said measured frequencies measured during said at least one first time interval comprises the step of for at least one of said object(s) at least once determining and providing at least one of the monitoring results by performing at least one of the steps of:

a) determining and providing a degree of impairment of the respective object, b) detecting and indicating an impairment of the respective object when the degree of impairment of the respective object exceeds a given threshold, c) issuing an alarm when the degree of impairment of the respective object exceeds a given threshold, d) determining and providing accretion as impairment cause when the measured frequencies measured during the first time intervals decrease over time, e) determining and providing corrosion or abrasion as impairment cause when the measured frequencies measured during the first time intervals increase over time, and f) determining and providing a remaining time remaining until the degree of impairment the respective object will exceed a given threshold.

A second refinement comprises a method, wherein:

said piping system is operable in the first mode and is operable in at least one additional mode, wherein said oscillatory element is immersed in a mode-specific product flowing through said pipe during each additional mode time interval, during which the piping system is operated in the respective additional mode, and for at least one of said additional modes, said method comprises the step of: based on the measured frequencies measured during at least one additional mode time interval, during which the piping system was operated in the respective additional mode, performing at least one of the steps of:

monitoring the condition of at least one of said object(s) and determining and providing at least one monitoring result, and for at least one of said object(s) at least once determining at least one monitoring result by performing at least one of the steps of:

a) determining and providing a degree of impairment of the respective object, b) detecting and indicating an impairment of the respective object when the degree of impairment of the respective object exceeds a given threshold, c) issuing an alarm when the degree of impairment of the respective object exceeds a given threshold, d) determining and providing accretion as impairment cause when the measured frequencies measured during the additional mode time intervals decrease over time, e) determining and providing corrosion or abrasion as impairment cause when the measured frequencies measured during the additional mode time intervals increase over time, and f) determining and providing a remaining time remaining until the degree of impairment the respective object will exceed a given threshold.

A refinement of the second refinement comprises a method further comprising the step of at least once performing the steps of:

at a first time determining a first degree of impairment based on the measured frequencies measured during at least one of the first time intervals, at a second time determining a second degree of impairment based on measured frequencies measured during at least one of the additional mode time intervals, wherein said first degree of impairment and said second degree of impairment are either both degrees of impairment of said oscillatory element or both degrees of impairment of the same one of said object(s), and issuing a notification indicating an impaired monitoring capability of the monitoring method when the time difference between the first time and the second time is smaller than a given reference value and a deviation between the first degree of impairment and the second degree of impairment exceeds a predetermined threshold.

A third refinement comprises a method, further comprising at least one of the steps of:

a) by means of at least one sensor, measuring at least one variable having an effect on the resonance frequency of the oscillatory element, b) by means of a temperature sensor, measuring a variable given by a temperature said oscillatory element is exposed, and c) by means of a pressure sensor, measuring a variable given by a pressure inside the pipe, and said method further comprising the steps of:

based on at least one of the measured variables, performing a compensation of a dependency of the measured frequencies measured by the vibratory device on the respective variable(s), and applying the compensated measured frequencies as measured frequencies throughout the monitoring method.

A fourth refinement comprises a method, further comprising at least one of the steps of at least once:

a) scheduling or scheduling and performing a replacement of at least one of said objects according to the degree of impairment and/or the remaining time determined and provided by the monitoring method for the respective object when corrosion or abrasion has been determined as impairment cause, b) performing a replacement, wherein at least one or all of said objects and said vibratory device or at least said oscillatory element are replaced and resuming or restarting the monitoring method after the replacement, c) scheduling or scheduling and performing a cleaning of at least one of said objects or a cleaning of the pipe performed whilst at least one or all of said object(s) remain on the piping system according to the degree of impairment and/or the remaining time determined and provided by the monitoring method for at least one of said objects when accretion has been determined as impairment cause, d) during a cleaning time interval cleaning the pipe whilst said objects and the vibratory device including the oscillatory element extending into the pipe remain in place and performing at least one of:

resuming or restarting the monitoring method after the pipe has been cleaned, determining and providing an indicator indicative of an effectiveness of the cleaning, and/or determining and providing an indicator indicative of an effectiveness of the cleaning based on or as a difference between or a quotient of a first degree of impairment determined based on measured frequencies measured before the cleaning of said pipe was performed and a second degree of impairment determined based on measured frequencies measured after the respective cleaning of said pipe was performed, wherein said first degree of impairment and said second degree of impairment are either both degrees of impairment of said oscillatory element or both degrees of impairment of the same object.

A fifth refinement comprises a method further comprising the method steps of:

providing said measured frequencies and said corresponding measurement times to a calculating unit, and by means of said calculating unit performing said monitoring of said condition of said object(s) based on said measured frequencies and said measurement times provided to said calculating unit, wherein said calculation unit is embodied to perform said monitoring and said determination of said at least one monitoring result, wherein said calculation unit determines said measured frequencies measured during said first time intervals based on said measured frequencies, said corresponding measurement times and said first time intervals, and wherein said first time intervals are either provided to said calculation unit or determined by said calculation unit based on said measured frequencies and said corresponding measurement times provided to said calculating unit.

A preferred refinement of the fifth refinement comprises a method, wherein said calculating unit:

is trained or designed to learn said determination of said first time intervals based on the measured frequencies and the measuring times provided to it, and performs said determination of said first time intervals based on said measured frequencies and said corresponding measuring times provided to said calculating unit based on a previously determined or learned model for said determination of said first time intervals.

A first refinement of the preferred refinement comprises a method, wherein:

said model is determined based on training data comprising measured frequencies and corresponding measurement times comprising measured frequencies measured during first time intervals, during which first time intervals the piping system was operated in the first mode and the oscillatory element of the vibratory device or an identical oscillatory element of a vibratory device of the same type was immersed in the first medium, said training data additionally comprises the first time intervals, and the model is determined or learned based on model inputs, given by the measured frequencies and the corresponding measurement times, and model outputs, given by the first time intervals, both comprised in the training data.

A second refinement of the preferred refinement comprises a method, comprising the steps of:

a) determining said model based on measured frequencies and corresponding measurement times measured during a preliminary time interval during which the piping system was operated in at least two different modes comprising the first mode by:

a1) recording said measured frequencies measured during said preliminary time interval, a2) determining filtered frequencies by applying a filter to the recorded frequencies, a3) determining changing times when the operation mode of the piping system was changed, wherein said changing times are either determined based on said filtered frequencies or determined by determining a time derivative of said filtered frequencies and determining said changing times to each be equal to a peak or valley time at which said time derivative exhibits an extremum, in particular an extremum exceeding a given threshold, a threshold determined based on an outlier detection performed based on said time derivative of said filtered frequencies or a threshold larger than a noise superimposed on said filtered frequencies, a4) based on the changing times identifying time intervals during which the piping system was operated in a single operation mode, a5) for each of said time intervals either determining a set of at least one statistical property of said measured frequencies and/or said filtered frequencies measured during the respective time interval or determining a set of at least one statistical property comprising at least one of: an average of the measured frequencies and/or the filtered frequencies measured during the respective time interval and/or a standard deviation or variance of the measured frequencies and/or the filtered frequencies measured during the respective time interval, a6) based on the sets of statistical properties determined for each of the time intervals identifying those time intervals during which the piping system was operated in the same operation mode, a7) determining one of the operation modes identified and identifiable based on the corresponding set of statistical properties as the first mode applied to perform the monitoring, and b) during monitoring, determining the first time intervals based on the set of statistical properties representative of the first mode by:

b1) recording the measured frequencies and the corresponding measurement times and filtering said recorded frequencies, b2) determining changing times that occurred during monitoring or determining changing times that occurred during monitoring to each be equal a peak or valley time at which a time derivative of said filtered frequencies exhibits an extremum, b3) based on said changing times identifying time intervals during which the piping system was operated in a single operation mode, and b4) for each of said time intervals determining the set of statistical properties of the measured frequencies and/or the filtered frequencies measured during the respective time interval, b5) comparing said sets of statistical properties to said set of statistical properties representative of the first mode and based on said comparison identifying sets of statistical properties corresponding to the set of statistical properties representative of the first mode and identifying the corresponding time intervals as first time intervals.

A refinement of the method according to the first and the fifth refinement comprises a method, wherein:

for at least one of said additional modes said calculation unit determines said measured frequencies measured during said additional mode time intervals based on said measured frequencies, said corresponding measurement times and said additional mode time intervals, and said additional mode time intervals are either provided to said calculation unit or determined by said calculation unit based on said measured frequencies and said corresponding measurement times provided to said calculating unit, wherein additional mode time intervals determined by said calculation unit are determined by a determination method corresponding to a determination method applied by the calculation unit to determine first time intervals.

A sixth refinement comprises a method, further comprising at least one of the steps of:

a) at least once providing a cleaning time interval during which said pipe was cleaned to said calculation unit, or by means of said calculating unit at least once determining a cleaning time interval during which said pipe was cleaned by performing a determination method corresponding to a determination method applied by the calculation unit to determine said first time intervals and/or said additional operation time interval, b) predetermining said first mode to be given by a first operation mode during which a first product is flowing through the pipe, to be given by a pause mode during which no product is flowing through the pipe and the empty pipe is filled with air or a gas, or to be given by a cleaning mode during which the cleaning agent is flowing through the pipe, c) for at least one or each of said object(s) determining a quantitative relation representing the correspondence between the susceptibility of the respective object and the susceptibility of the oscillating element and applying this quantitative relation to monitor the condition of the respective object based on the measured frequencies indicative of the condition of the oscillatory element, wherein each quantitative relation is either determined based on the product(s) and the material of the exposed surface(s) of the respective object and of the oscillating element, or determined based on the product(s) and the material of the exposed surface(s) of the respective object and of the oscillating element and at least one of: a property, a surface-shape and/or a surface-roughness of the surface(s) and/or a position the surface(s) of the respective object inside or in relation to the pipe, d) based on a relationship between a degree of impairment of said oscillatory element and a frequency change of the resonance frequency caused by a change of an oscillating mass of said oscillators element caused by the degree of impairment, setting at least one of the thresholds for the degree of impairment of at least one of said objects according to a corresponding threshold value for the change of the oscillating mass, wherein said threshold values for the change of the oscillating mass are either default values defined based on the material and the design of the oscillatory element and the correspondence of or the quantitative relation between the susceptibility of the oscillatory element and the susceptibility of the respective object or determined additionally based on a property or a density of at least one of the products causing accretion.

A seventh refinement comprises a method, wherein:

said first mode is: a) a first operation mode during which the first medium given by a first product of said at least one products to be transported by the piping system is flowing through said pipe, b) a pause mode, during which no product is flowing through the pipe, wherein said first medium is given by air or another gas filling the pipe during the pause mode, or c) a cleaning mode during which the pipe is filled with a cleaning agent or filled with a cleaning agent flowing through the pipe, said degree of impairment of at least one of said object(s) is determined at least once, continuously or repeatedly based on a comparison of at least one property and/or an average of measured frequencies comprised in a first set of measurement data comprising most recently measured frequencies each measured during one of the first time intervals and a reference value predetermined for the property, said remaining time determined for at least one of said objects is determined based on said measured frequencies and said corresponding measuring times at least once, continuously or repeatedly:

a) by means of a time series prediction method and/or by means of a linear or non-liner extrapolation method performed based on the frequencies measured during the first intervals, b) by repeatedly determining the degree of impairment of respective object over a time period during which the degree of impairment can be expected to change, determining a rate of change of these degrees of impairment, and by determining said remaining time based on the present degree of impairment and said rate of change, and/or c) by providing said measured frequencies and corresponding measurement times to said calculating unit performing said determination of said remaining time, wherein said calculating unit is embodied to determine said remaining time based on the measured frequencies and the measuring times provided to it and a model for determining said remaining time, wherein said model is either a previously determined model stored in a memory of said calculation unit or a model learned by said calculating unit designed to learn said model based on the measured frequencies and the measuring times provided to it.

An eighth refinement of the method comprises a method wherein said object(s) comprise at least one of:
- an object given by an inside wall of the pipe,
- an object given by a valve installed on said pipe,
- an object given by a thermowell installed on said pipe,
- an object given by a compensator connected to said pipe, and/or
- at least one object given by a sensor, a pump, an aggregate or a device, each having at least one surface exposed to the product(s) flowing through said pipe.

The present disclosure further comprises a monitoring system for performing the method according to the present disclosure, said system comprising:
- said vibratory device installed on said pipe comprising said oscillatory element extending into said pipe and exhibiting said susceptibility to an impairment caused by accretion, abrasion and/or corrosion corresponding to the respective susceptibilities of said object(s), said transducer causing said oscillatory element to oscillate at said resonance frequency and said measurement unit measuring said resonance frequency, and
- said calculation unit directly or indirectly connected to or communication with said vibratory device, wherein said calculation unit is embodied to perform said monitoring based on said measured frequencies measured by said vibratory device and said corresponding measurement times provided to said calculating unit, and wherein said calculating unit is trained or designed to learn the determination of at least one of: said remaining time, said first time intervals, said additional time intervals and/or said cleaning time intervals based on the measured frequencies and the measuring times.

The present disclosure further comprises a computer program comprising instructions which, when the program is executed by a computer, cause the computer to carry out the monitoring method according to the present disclosure based on the measured frequencies and the corresponding measurement times provided to said computer.

The present disclosure further comprises a computer program product comprising the computer program according to the present disclosure and at least one computer readable medium, wherein at least the computer program is stored on the computer readable medium.

BRIEF DESCRIPTION OF THE DRAWINGS

The present disclosure and further advantages are explained in more detail using the figures of the drawing.

DETAILED DESCRIPTION

Figure 1:
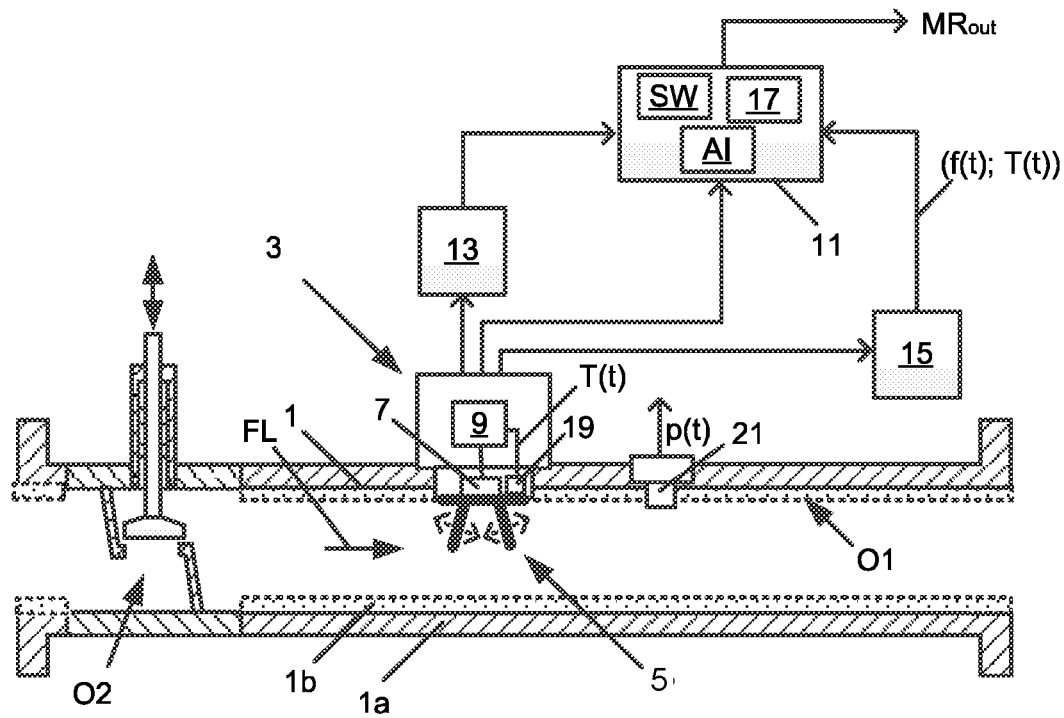
FIGS. 1, 2, and 3 show a monitoring system for monitoring a condition of at least one object.
Figure 2:
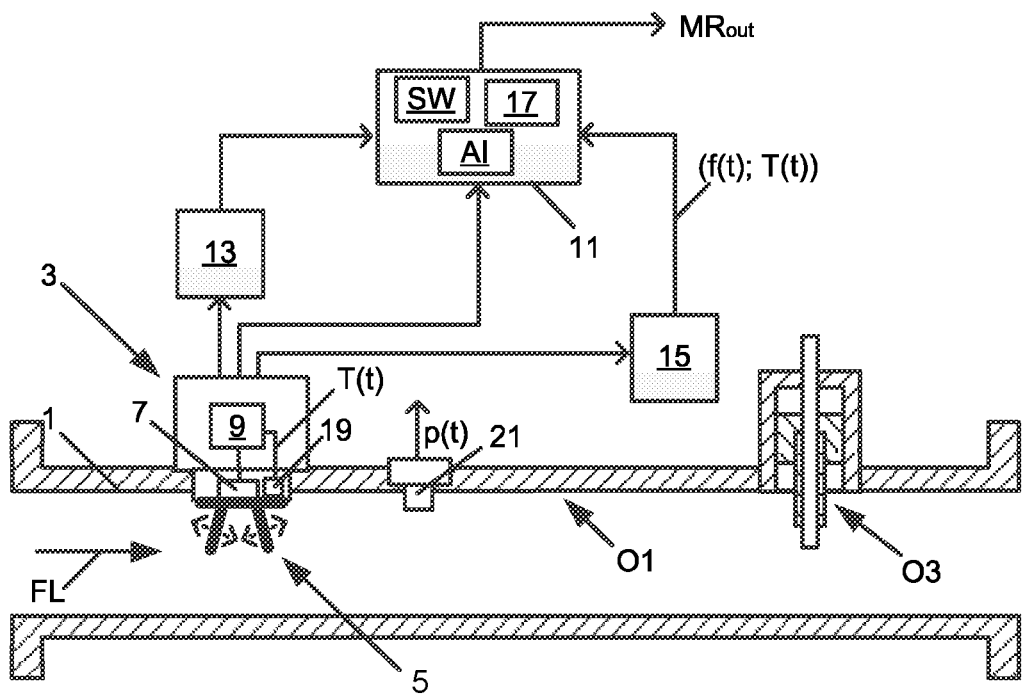
Figure 3:
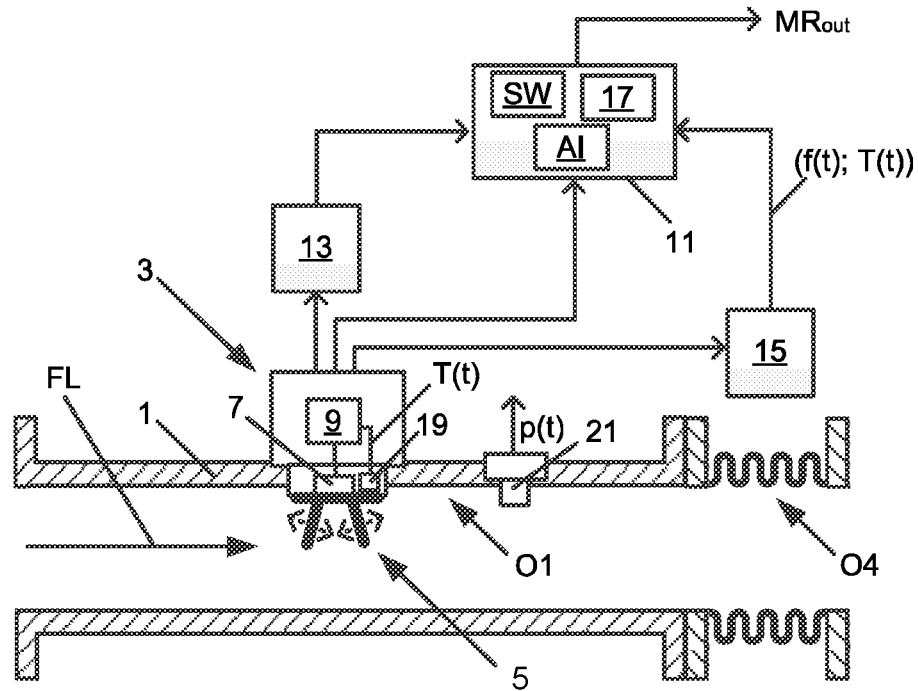

The present disclosure concerns a monitoring system for and a monitoring method of, in particular a computer implemented method of, monitoring a condition of at least one object $O_J$ comprised in a piping system for transporting at least one product. The piping system can be any piping system comprising at least one pipe 1 transporting the product(s), wherein the piping system is operable in a first mode during which the pipe 1 is filled with a first medium. Examples are piping systems applied in the oil and gas industry for transporting oil, naphtha, or other liquids or gases, piping systems applied in the chemical industry for transporting chemicals, like e.g. acids, or piping systems applied for transporting other products, like e.g. products comprising lime, paints or varnishes. These piping systems are applied to transport at least one product. Thus, they are operably in at least one operation mode during which a mode-specific product, namely one of the products to be transported by the piping system, is flowing through the pipe 1. FIGS. 1, 2, and 3 show an example of a monitoring system for monitoring at least one object $O_J$. In these figures, a direction of flow of the respective mode-specific product is indicated by an arrow FL. As an example, the pipe 1 can e.g. be a metal pipe, a plastic pipe or a pipe 1 comprising an outer tube 1a, e.g. a metal outer tube, and an inner liner 1b, e.g. a synthetic inner liner. The optional inner liner 1b is indicated by dotted lines in FIG. 1.

The present disclosure can be applied to monitor the condition of any object $O_J$ having at least one surface exposed to the product(s) flowing through the pipe 1. Some examples are shown in FIGS. 1, 2 and 3. The examples comprise:
- an object O1 shown in FIGS. 1, 2 and 3 given by an inside wall of the pipe 1,
- an object O2 shown in FIG. 1 given by a valve installed on the pipe 1,
- an object O3 shown in FIG. 2 given by a thermowell installed on the pipe 1, and/or
- an object O4 shown in FIG. 3 given by a compensator connected to the pipe 1.

Valves are applied to control the flow of the product(s) flowing through the pipe 1. Thermowells are e.g. applied as protection tubes surrounding a sensor or a probe extending into the pipe 1. Compensators, like e.g. the bellow shaped pipe segment shown in FIG. 3, are e.g. inserted in-between connected pipes 1 to absorb or at least reduce forces caused by pipe movements and/or thermal expansion of the pipes 1. Each of these objects O1, O2, O3, O4 has at least one surface exposed to the product(s) flowing through the pipe 1. The present disclosure is not limited to the objects O1, O2, O3, O4 mentioned herein as examples. It can be applied in the same way with respect to any other object $O_J$, like e.g. a sensor, a pump, an aggregates or any other device, having at least one surface exposed to the product(s) flowing through the pipe 1. Due to the exposure of their surface(s) to the product(s), these object $O_J$ are susceptible to an impairment caused by at least one of: accretion, abrasion and/or corrosion. The size of the susceptibility depends on the type of product(s) and the properties, in particular the material of the exposed surface(s).

According to the present disclosure, the system comprises a vibratory device 3 comprising an oscillatory element 5. This vibratory device 3 is installed on the pipe 1 such, that the oscillatory element 5 extends into the pipe 1. The vibratory device 3 comprises a transducer 7 causing the oscillatory element 5 to oscillate at a resonance frequency and a measurement unit 9 measuring the resulting oscillation frequency. In the example shown, the oscillatory element 5 is a tuning fork having two spaced apart rods attached to a diaphragm. Here the transducer 7 interacts with the diaphragm and thus causes the rods to oscillate. The present disclosure is not limited to this type of oscillatory element 5. Other types of oscillatory elements known in the art can be used instead.

Due to its exposure to the product(s) flowing through the pipe 1, the oscillatory element 5 exhibits a susceptibility to an impairment caused by accretion, abrasion and/or corrosion corresponding to the respective susceptibilities of the object(s) $O_J$ to be monitored. The susceptibility of the oscillatory element 5 is preferably of the same size or larger than the susceptibility of the respective object $O_J$. To achieve this, the oscillatory element 5 is e.g. made out of the same material as the exposed surface(s) of the object(s) $O_J$. As another example, in combination with an object $O_J$ comprising exposed surfaces consisting of a stainless steel the oscillatory element 5 can e.g. consist of a metal, like e.g. a steel, having a lower corrosion resistance and/or a lower abrasion resistance than the surface(s) of the object(s) $O_J$. As another example, a surface of the oscillatory element 5 can e.g. be rougher and thus more susceptible to accretion than the exposed surface(s) of the object(s) $O_J$. In case the pipe 1 comprises the inner liner 1b, the susceptibility of the inside wall of the pipe 1 is given by the susceptibility of the inner liner 1b. Depending on the number and/or the type(s) of monitored object(s) $O_J$ it may not always be possible to select the material and/or the surface properties of the oscillatory element 5 such, that the susceptibility of the oscillatory element 5 is of the same size or larger than the susceptibility of each of the object(s) $O_J$. In these cases, the oscillatory element 5 is preferably designed to have a high susceptibility.

Inside the pipe 1, the oscillatory element 5 is exposed to the same conditions prevailing inside the pipe 1 as the exposed surfaces of the object(s) $O_J$ to be monitored. Thus, conditions causing the surfaces of the object(s) $O_J$ to corrode will also cause oscillatory element 5 to corrode. The same applies with respect to abrasion caused by abrasive products transported through the pipe 1. Corrosion and abrasion of the oscillatory element 5 both reduce the oscillating mass and in consequence increase the resonance frequency of the oscillatory element 5. Conditions causing accretion result in an accretion layer building up on the surface(s) of the object(s) $O_J$, as well as on the oscillatory element 5. The accretion layer forming on the oscillatory element 5 increases the oscillating mass and thus reduces the resonance frequency.

During performance of the monitoring method the oscillatory element 5 is caused to oscillate at the resonance frequency and the resulting resonance frequency f(t) is measured continuously or repeatedly. The measured frequencies f(t) depend on the condition of the oscillatory element 5 and the conditions the oscillatory element 5 is exposed to inside the pipe 1.

When the piping system is operated in the first mode the pipe 1 is filled with the first medium. In consequence the oscillatory element 5 is immersed in the first medium. As one option, the first mode is e.g. a first operation mode of the at least one operation modes the piping system is operable in. In this case, the first medium filling the pipe 1 during the first mode is given by the mode-specific first product, flowing through the pipe 1 during the first operation mode.

As an alternative option, the first mode is e.g. a pause mode, during which no product is flowing through the pipe 1. In this case the pipe 1 is empty during the first mode and the first medium is air or another gas filling the pipe 1 during the pause mode. Applying the pause mode as first mode is advantageous because the resonance frequencies measured during this mode are not affected by fluctuations of the flow rate of a product flowing through the pipe 1. It is preferably applied, when the pause mode has a sufficiently high frequency of occurrence during operation of the piping system. As an example, this can e.g. be the case due to regular downtimes of a site comprising the piping system and/or due to frequent or regular interruptions of a process performed at a site comprising the piping system, e.g. in between production batches, during nighttime's and/or at weekends.

Figure 4:
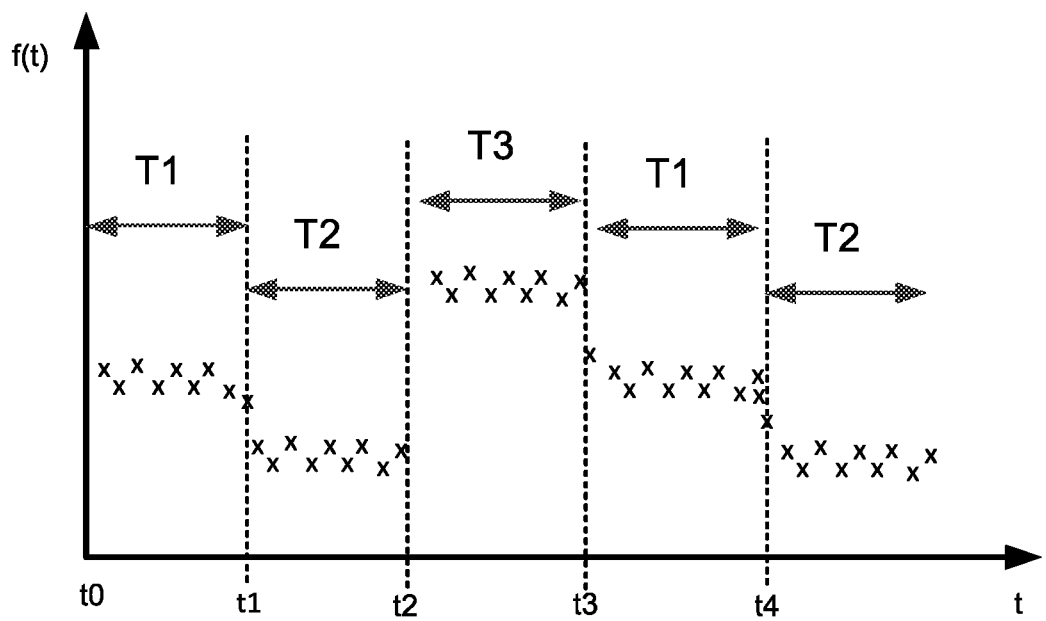
FIG. 4 shows measured frequencies measured by the vibratory device of FIG. 1.

FIG. 4 shows an example of measured frequencies f(t) measured during performance of a sequence of operation modes. The sequence began with the first operation mode performed during a first time interval T1 beginning at t0 and ending at t1, followed by a second operation mode performed during a second time interval T2 beginning at t1 and ending at t2, followed by a third operation mode performed during a third time interval T3 beginning at t2 and ending at t3, followed by an additional first operation mode performed during another first time interval T1 beginning at t3 and ending at t4, followed by an additional second operation mode performed during another second time interval T2 interval beginning at t4. In this example, the second product flowing through the pipe 1 during each second mode has a higher density and/or a higher viscosity than the first medium here given by the first product flowing through the pipe 1 during each first operation mode. In consequence the measured frequencies f(t) measured during each second interval T2 are lower than the measured frequencies f(t) measured during each first interval T1. Further, the third product flowing through the pipe 1 during the third mode has a lower density and/or a lower viscosity than the first medium. In consequence the measured frequencies f(t) measured during the third time interval T3 are higher than the measured frequencies f(t) measured during the first time intervals T1 and higher than the measured frequencies f(t) measured during the second time intervals T2.

Figure 5:
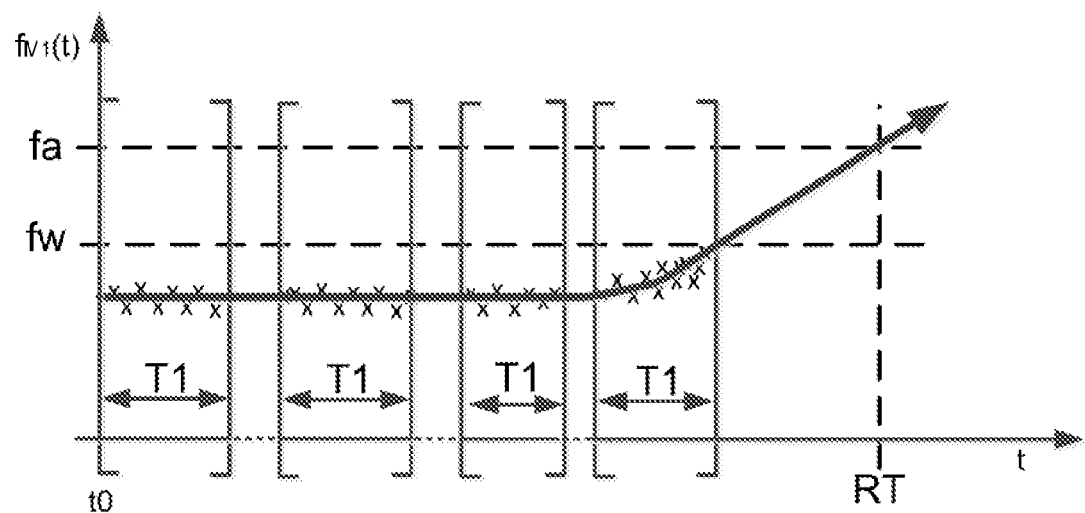
FIG. 5 shows measured frequencies indicative of an impairment caused by corrosion or abrasion.
Figure 6:
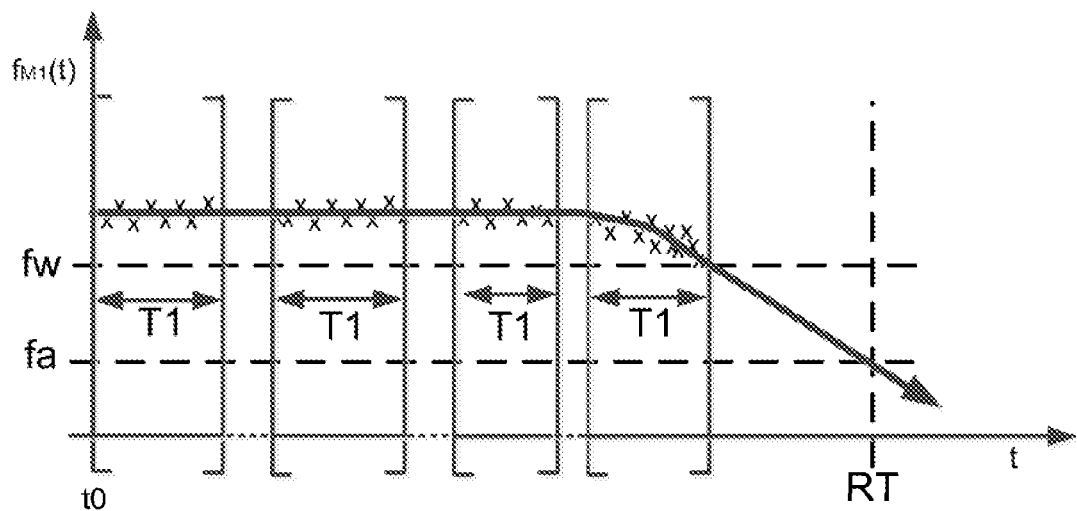
FIG. 6 shows measured frequencies indicative of an impairment caused by accretion.

According to the present disclosure, the condition of each of the at least one object(s) $O_J$ is monitored based on the measured frequencies $f_{M1}(t)$ measured during at least one first time interval T1, during which the piping system was operated in the first mode and the oscillatory element 5 was immersed in the first medium filling the pipe 1 and a corresponding monitoring result is provided. To illustrate the monitoring method, FIGS. 5 and 6 each show an example of measured frequencies f(t) solely comprising measured frequencies $f_{M1}(t)$ measured during consecutive spaced apart first intervals T1. By performing the monitoring based on the measured frequencies $f_{M1}(t)$ measured during the first intervals T1, it is ensured that the conditions the oscillatory element 5 is exposed to inside the pipe 1 during performance of these measurements, can be assumed to be approximately identical. Thus, an increase over time indicated by an arrow in FIG. 5 of the measured frequencies $f_{M1}(t)$ measured during the first intervals T1 is indicative of an impairment of the oscillatory element 5 caused by corrosion or abrasion and a decrease over time indicated by an arrow in FIG. 6 of the measured frequencies $f_{M1}(t)$ measured during the first intervals T1 is indicative of an impairment of the oscillatory element 5 caused by accretion. Due to the fact that the susceptibility of the oscillatory element 5 to an impairment corresponds to the susceptibility of the respective object $O_J$, and that the oscillatory element 5 extending into the pipe 1 was always exposed to the same conditions and the same product(s) as the exposed surface(s) of the object(s) $O_J$, an impairment of the oscillatory element 5 is indicative of a corresponding impairment of the respective object $O_J$.

The method according to the present disclosure provides the advantages mentioned above. As an option, individual steps of the method can be implemented in different ways without deviating from the scope of the present disclosure. Several optional presently preferred embodiments are described in more detail below. As one option, the monitoring method preferably comprises the additional step of for at least one of the monitored objects $O_J$ based on the measured frequencies $f_{M1}(t)$ measured during at least one first time intervals T1 at least once determining at least one of the monitoring results by performing at least one of the steps of:

a) determining and providing a degree of impairment of the respective object $O_J$, b) detecting and indicating an impairment of the respective object $O_J$ when the degree of impairment of the respective object $O_J$ exceeds a given threshold fw, c) issuing an alarm when the degree of impairment of the respective object $O_J$ exceeds a given threshold fa, d) determining and providing accretion as impairment cause when the measured frequencies $f_{M1}(t)$ measured during the first time intervals T1 decrease over time, e) determining and providing corrosion or abrasion as impairment cause when the measured frequencies $f_{M1}(t)$ measured during the first time intervals T1 increase over time, and f) determining and providing a remaining time RT remaining until the degree of impairment the respective object $O_J$ will exceed a given threshold fa.

At least one preferably all of these monitoring results a) to f) are preferably issued, indicated or provided via a corresponding output $MR_{Out}$ of the monitoring system shown in FIGS. 1, 2 and 3.

An impairment of a certain degree causes a frequency change of the resonance frequency of the oscillatory element 5 corresponding to a change of the oscillating mass caused by the respective impairment. Thus, the size of the change of the resonance frequency is a quantitative measure for the degree of impairment of the oscillatory element 5, which in turn is indicative of a corresponding degree of impairment of the respective object $O_J$. Due to the correspondence of the susceptibility of the respective object $O_J$ to an impairment to the susceptibility of the oscillating element 5, the degree of impairment of the oscillatory element 5 is a quantitative measure of the degree of impairment of the respective object $O_J$. In this respect, a quantitative relation representing the correspondence between the susceptibility of the respective object $O_J$ and the susceptibility of the oscillating element 5 is preferably determined and applied to monitor the condition of the respective object $O_J$ based on the measured frequencies f(t) indicative of the condition of the oscillatory element 5. Based on this quantitative relation, the degree of impairment of the respective object $O_J$ is then preferably calculated based on the degree of impairment of the oscillatory element 5 which in turn is determined based on the measured frequencies f(t), in particular the measured frequencies $f_{M1}(t)$ measured during the first time intervals T1, and the quantitative relation. Each quantitative relation is preferably determined based on the product(s) and the materials of the exposed surface(s) of the respective object $O_J$ and of the oscillating element 5. As an option, each quantitative relation is preferably determined additionally based on at least one other property of the surface(s) of the respective object $O_J$, like e.g. their surface-shape, their surface-roughness and/or their position inside or in relation to the pipe 1. As an example, regarding accretion, by means of the quantitative relation a higher degree of impairment is preferably determined based on the same degree of the impairment of the oscillatory element 5 for objects $O_J$ having rougher surfaces and/or surfaces surrounding a recess than for objects $O_J$ having flatter and/or smoother surfaces less susceptible to accretion formation.

As an example, the degree of impairment of the object(s) $O_J$ is preferably determined based on a comparison of at least one property of measured frequencies $f_{M1}(t)$ comprised in a first set of measurement data comprising most recently measured frequencies $f_{M1}(t)$ measured during at least one of the first time intervals T1 and a reference value predetermined for the property. The properties of the measured frequencies $f_{M1}(t)$ comprised in the set e.g. comprise an average of these measured frequencies $f_{M1}(t)$. The reference value is preferably determined based on a reference set of measured frequencies, each measured during a reference time interval, wherein the object(s) $O_J$ and the oscillatory element 5 were fully intact (not impaired) and the piping system was operated in the first mode and the unimpaired oscillatory element 5 was immersed in the first medium.

Based on the frequency change caused by an impairment the corresponding change of the oscillating mass of the oscillatory element 5 can be determined and vice versa. Thus, the thresholds fw, fa for the degree of impairment, e.g. for detecting an impairment, for issuing an alarm and/or for determining the remaining time RT, can e.g. each be given by or set according to a corresponding threshold value for the change of the oscillating mass. As an option these threshold values can e.g. each be set to be equal to a default value defined based on the material and the design of the oscillatory element 5 and the correspondence, in particular the quantitative relation, between the susceptibility of the respective object $O_J$ and the susceptibility of the oscillating element 5. With respect to accretion monitoring, these threshold values are preferably determined by additionally taking into account at least one property, like e.g. the density, of the product(s) causing accretion during operation of the piping system. By applying higher threshold values for the change of the oscillating mass in applications, wherein accretion is caused by products having a higher density than in applications, wherein accretion is caused by products having a lower density, the same sensitivity of the monitoring method to the thickness of the accretion layer building up on the exposed surface(s) of the respective object $O_J$ can be achieved.

The remaining time RT is preferably determined at least once, continuously or repeatedly by means of a time series prediction method and/or by means of a linear or non-liner extrapolation method performed based on the frequencies $f_{M1}(t)$ measured during the first intervals T1. As an alternative option, the remaining time RT can be determined by repeatedly determining the degree of impairment over a time period, during which the degree of impairment can be expected to change. Next, a rate of change of these degrees of impairment is determined and the remaining time RT is then determined based on the present degree of impairment and the rate of change.

As an option the monitoring method described above and preferably also at least one, preferably all of the steps a) to f) are preferably performed by a calculation unit 11 directly or indirectly connected to or communicating with the vibratory device 3. In this case, the measured frequencies f(t) measured by the vibratory device 5 and the corresponding measurement times t are provided to the calculating unit 11. In the following, the measured frequencies f(t) are considered to be provided in form of a time series. As an alternative option, they can be provided in form of a continuous measurement signal. The calculation unit 11 can e.g. be embodied as a unit comprising hardware, like e.g. a computer or a computing system, located in the vicinity of the vibratory device 3 or at a remote location. As an alternative option cloud computing can be applied. Cloud computing denominates an approach, wherein IT-infrastructure, like hardware, computing power, memory, network capacity and/or software are provided via a network, e.g. via the internet. In that case, the calculation unit 11 is embodied in the cloud.

The vibratory device 5 can e.g. be connected to and/or communicate with the calculation unit 11 directly, via a super-ordinated unit 13 and/or via an edge device 15 located in the vicinity of the pipe 1. To this extent hard wired or wireless connections and/or communication protocols known in the art, like e.g. LAN, W-LAN, Fieldbus, Profibus, Hart, Bluetooth, Near Field Communications etc. can be applied. As an example, the vibratory device 5, the edge device 15 and/or the super-ordinated 13 can be directly or indirectly connected to the calculation unit 11 via the internet, e.g. via a communication network, like e.g. TCP/IP.

As an example, the super-ordinated unit 13 can e.g. comprise a control system performing at least one of: managing process control, process visualization and process monitoring of the operation of the piping system and/or a process performed on an industrial site comprising the piping system.

As an option, the calculating unit 11 is preferably embodied to determine the remaining time RT based on the measured frequencies f(t) and the measuring times t provided to the calculating unit 11. This determination can be performed as described above. As an additional or alternative option, the calculating unit 11 can be embodied to determine the remaining time RT based on a model for determining the remaining time RT. This model can e.g. be a model determined based on training data and stored in a memory 17 of the calculating unit 11. As an alternative option, the calculating unit 11 is designed to learn the determination of the remaining time RT based on the measured frequencies f(t) and the measuring times (t) provided to it and based on the first time intervals T1 determined by or provided to the calculating unit 11. In this case it is preferably equipped with artificial intelligence AI performing the learning process. Based on training data applied to perform the learning, the learning process preferably provides a learned model representing the interdependency between the input values, namely the measured frequencies f(t) and the corresponding measurement times t, and the output values, namely the remaining time RT. Examples for learning processes are so-called Recurrent Neural Networks (RNN) with Long Short Term Memory (LSTM), which are particularly well suited for time series. The present disclosure is however neither limited to this type of learning nor to neural networks. Other techniques and/or methods of machine learning, like e.g. methods of determining deterministic models, methods applying k-nearest neighbor algorithms (k-NN), methods applying support vector machines or networks (SVM), methods applying robust covariances and/or methods applying Monte Carlo simulations, can be used instead of, in addition to or in combination with learning and/or neural networks. As an additional or alternative option methods for determining traditional time series models, like e.g. auto regressive integrated moving average models (ARIMA), can be used instead or in combination with the determining methods described above.

Regardless of which of the previously described methods of determining the remaining time RT is applied, each determination of the remaining time RT is performed based on the quantitative relation representing the correspondence between the susceptibility of the respective object $O_J$ and the susceptibility of the oscillating element 5.

The monitoring of the condition of the object(s) $O_J$ is performed based on the measured frequencies $f_{M1}(t)$ measured during at least one of the first intervals T1. When this method is applied to a piping system, which is always operated in the first mode, all measured frequencies f(t) can be used and no further action is required. With respect to piping systems, operable in the first mode and at least one other mode, like e.g. an additional operation mode, the measured frequencies $f_{M1}(t)$ measured during the first intervals T1 have to be identified. This can e.g. be done by providing the first intervals T1 to the calculating unit 11, e.g. by means of the super-ordinated unit 13 controlling the modes of operation of the piping system. In this case the calculating unit 11 selects the measured frequencies $f_{M1}(t)$ measured during the first time intervals T1 based on the first time intervals T1, the measured frequencies f(t) and the corresponding measurement times t provided to it.

As an additional or alternative option, the calculating unit 11 is preferably embodied to determine the first time intervals T1 itself based on the measured frequencies f(t) and the corresponding measurement times t provided to it. In this case, the calculating unit 11 is preferably trained or designed to learn the determination of the first time intervals T1 based on the measured frequencies f(t) and the measuring times t provided to it. In case the calculating unit 11 is trained to determine the first time intervals T1, it preferably comprises a previously determined model for determining the first time intervals T1 stored in a memory 17 of the calculation unit 11 and performs the determinations based on this model. In case the calculating unit 11 is designed to learn the determination of the first time intervals T1, it is preferably equipped with artificial intelligence AI performing the learning process. Based on training data applied to perform the learning, the learning process preferably provides a learned model representing the interdependency between the input values, namely the measured frequencies f(t) and the corresponding measurement times t, and the output values, namely the first time intervals T1. Examples for learning processes are so-called Recurrent Neural Networks (RNN) with Long Short Term Memory (LSTM), which are particularly well suited for time series. The present disclosure is however neither limited to this type of learning nor to neural networks. Other techniques and/or methods of machine learning, like e.g. methods of determining deterministic models, methods applying k-nearest neighbor algorithms (k-NN), methods applying support vector machines or networks (SVM), methods applying robust covariances and/or methods applying Monte Carlo simulations, can be used instead of, in addition to or in combination with supervised learning and/or neural networks.

Different types of methods can be applied to determine and/or to learn the model. Two presently preferred versions are described below. With respect to both versions, the training data applied to determine the model and/or to learn the determination the first time intervals T1 comprises measured frequencies f(t) and corresponding measurement times t comprising measured frequencies $f_{M1}(t)$ measured during first time intervals T1, during which the piping system was operated in the first mode and the oscillatory element 5 of the vibratory device 3 or an identical oscillatory element of a vibratory device of the same type was immersed in the first medium.

According to the first version, the training data additionally comprises the first time intervals T1 during which the piping system was operated in the first mode. In this case, the model is determined or learned based on the model inputs, given by the measured frequencies f(t) and the corresponding measurement times t, and the model outputs, given by the first time intervals T1, both comprised in the training data.

Figure 7:
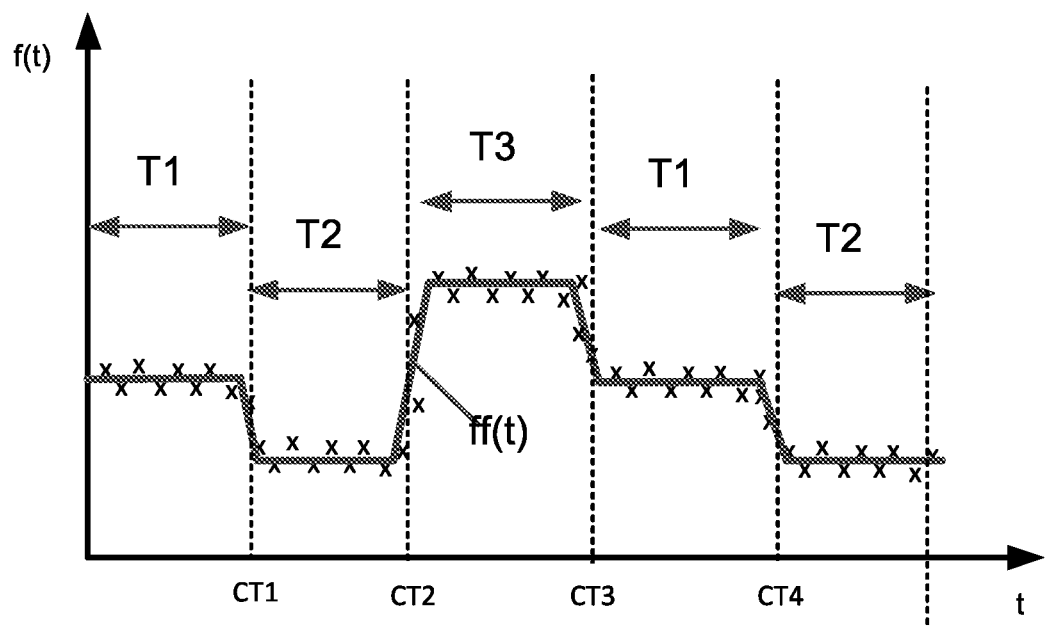
FIG. 7 shows recorded frequencies measured during a fraction of a preliminary time interval.

According to the second version, the model for determining the first time intervals T1 is determined or learned based on measured frequencies f(t) measured during a preliminary time interval, during which the piping system was operated in at least two different modes comprising the first mode as one of them. These measured frequencies f(t) are recorded. FIG. 7 shows recorded frequencies f(t) measured during a fraction of a preliminary time interval, during which the piping system was operated in the same sequence of operation modes as in the example shown in FIG. 4. Next, the recorded frequencies f(t) are filtered by applying a filter to the recorded frequencies f(t). The filter can be any means or method capable of separating a signal comprised in the recorded frequencies f(t) from a noise N superimposed on the signal. As an example a smoothing filter or a Kalman filter can be used. In FIG. 7, the thus obtained filtered frequencies ff(t) are indicated by a solid line.

Figure 8:
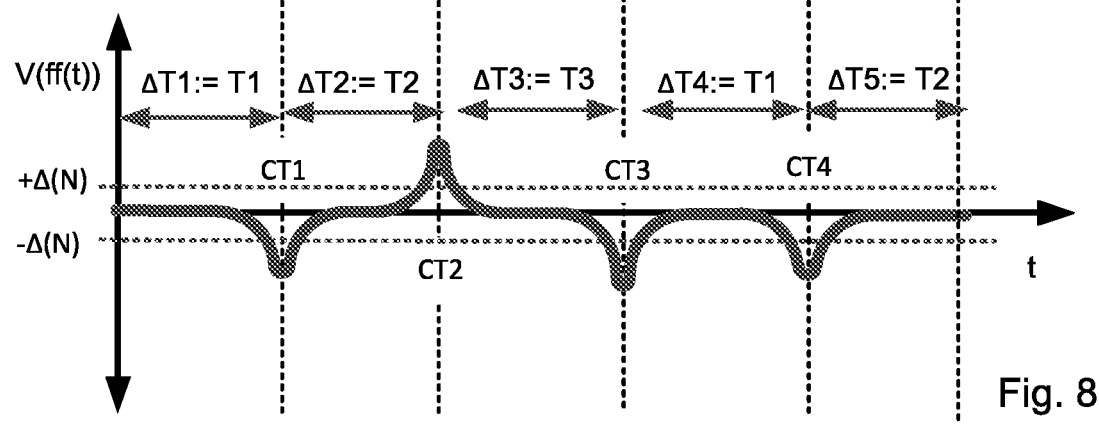
FIG. 8 shows a time derivative of filtered frequencies obtained by filtering the recorded frequencies of FIG. 7.

Each change of the operation mode of the piping system is associated with a corresponding change of the medium filling the pipe 1 or the mode-specific product flowing through the pipe 1. In consequence each change of the operation mode causes a corresponding change of the recorded frequencies f(t) and the filtered frequencies ff(t) at a changing time CTi, when the operation mode was changed. Thus, the second version comprises the method step of determining these changing times CTi. This is preferably done by determining a time derivative v(ff(t)) of the filtered frequencies ff(t) and by determining the changing times CTi to each be equal to a peak or valley time at which the time derivative v(ff(t)) exhibits an extremum. This is illustrated in FIG. 8 showing the time derivative v(ff(t) of the filtered frequencies ff(t) shown in FIG. 7. In the example shown, the thus determined changing times CTi comprise the changing times CT1, CT2, CT3 and CT4 shown in FIG. 7 and FIG. 8. Preferably, only extrema exceeding a given threshold +/−Δ (N), like e.g. a threshold larger than the noise N superimposed on the filtered frequencies ff(t), are considered as extrema caused by a change of the operation mode. As an alternative or additional option, a threshold determined based on an outlier detection performed based on the time derivative v(ff(t) of the filtered frequencies ff(t) is preferably applied.

Following this, time intervals ΔTi during which the piping system was operated in a single operation mode are identified based on the changing times CTi, as indicated by the time intervals ΔTi comprising the time intervals ΔT1, ΔT2, ΔT3, ΔT4, ΔT5 shown in FIG. 8. Next, for each of these time intervals ΔTi a set of at least one statistical property of the measured frequencies f(t) and/or the filtered frequencies ff(t) measured during the respective time interval ΔTi is determined. These sets preferably each comprise an average of the measured frequencies f(t) and/or of the filtered frequencies ff(t) measured during the respective time interval ΔTi and/or a standard deviation or variance of the measured frequencies f(t) and/or the filtered frequencies ff(t) measured during the respective time interval ΔTi.

Each set of statistical properties determined based on measured frequencies f(t) measured during one specific mode of operation will be different from the sets of statistical properties determined based on measured frequencies f(t) measured during another mode of operation. Thus, based on the sets of statistical properties determined for each of the time intervals ΔTi, the time intervals ΔTi during which the piping system was operated in the same operation mode are identified. Next, one of the operation modes identified and identifiably based on one of the sets of statistical properties representative of this mode is determined as the first mode applied to perform the monitoring of the condition of the object(s) $O_J$. In addition, the corresponding set of statistical properties representative of the first mode is preferably stored in the memory 17 of the calculation unit 11.

The set of statistical properties representative of the first mode is then applied to determine the first time intervals T1 based on the measured frequencies f(t) and the corresponding measurement times t measured during monitoring. To this extent the measured frequencies f(t) and the corresponding measurement times t measured during monitoring are recorded and the recorded frequencies f(t) are filtered in the same way as described above with respect to the frequencies f(t) measured during the preliminary time interval. Next the time derivative v(ff(t)) of the filtered frequencies ff(t) is determined and the changing times CTi occurring during monitoring are determined to each be equal to a peak or valley time at which the time derivative v(ff(t)) exhibits an extremum. Again, the time intervals ΔTi between consecutive changes of the operation mode are recognized as time intervals ΔTi during which the piping system was operated in a single operation mode. Thus, in a next step, for each of these time intervals ΔTi, the set of statistical properties of the measured frequencies f(t) measured during the respective time interval ΔTi is determined as described above and compared to the set of statistical properties representative of the first mode. Based on this comparison, the sets of statistical properties corresponding to the set of statistical properties representative of the first mode are identified and the corresponding time intervals ΔTi are identified as first time intervals T1. As an option, the comparison is e.g. performed based on methods used in statistical data analysis, like e.g. hypothesis-testing, e.g. based on Chi-Square tests, based on methods used in non-parametric analysis, like e.g. Kruskal-Wallis test, or based on methods used in time series analysis, like e.g. stationarity test. In addition, sets of statistical properties are preferably only identified as sets corresponding to the set of statistical properties representative of the first mode, when a sufficiently high level of reliability for this to be true was ascertained by hypothesis testing.

Following this, the monitoring of the condition of the object(s) $O_J$ is performed as described above based on the measured frequencies f(t) measured during at least one of the thus identified first time intervals T1.

As an option, the monitoring performed based on the first mode as described above, can be performed in the same way for at least one additional mode Mi the piping system is operable in. In this case for at least one of the additional modes Mi, the monitoring method comprises the additional step of: monitoring the condition of at least one of the objects $O_J$ based on the measured frequencies $f_{Mi}(t)$ measured during at least one additional mode time interval Ti, during which the piping system was operated in the respective additional mode Mi and the oscillatory element 5 was immersed in the mode-specific product flowing through the pipe 1 during the respective additional mode Mi.

The monitoring performed based on the respective additional mode Mi is preferably performed by the calculating unit 11 based on the measured frequencies f(t) and the measurement times t provided to it. As described above with respect to the first mode, the additional mode time intervals Ti, during which the piping system was operated in the respective additional mode Mi, can be provided to and/or be determined by the calculating unit 11. In the latter case, the calculation unit 11 is embodied to determine the additional mode time intervals Ti based on the measured frequencies f(t) and the corresponding measurement times t provided to it. To this extent, the calculating unit 11 is e.g. trained or designed to learn the determination of the additional mode time intervals Ti.

The model for determining the respective additional time intervals Ti can be determined according to the first version or the second version described above based on training data additionally comprising measured frequencies f(t) measured whilst the piping system was operated in the respective additional mode Mi. When the first version is applied, the training data additionally comprises the additional mode time intervals Ti, during which the piping system was operated in the respective additional mode Mi. When the second version is applied, the model for determining the first time intervals T1 and the respective additional mode time intervals Ti are determined as described above based on measured frequencies f(t) measured during a preliminary time interval, during which the piping system was operated in different modes comprising the first mode and the respective additional mode Mi. In this case, the set of statistical properties representative of the first mode and the set of statistical properties representative of the respective additional mode Mi are determined as described above and preferably stored in the memory 17 of the calculation unit 11. Based on these sets the calculation unit 11 is then able to determine the additional mode time intervals Ti based on the measured frequencies f(t) and the measurement times t provided to it in the same was as described above with respect to the determination of the first time intervals T1.

During monitoring, the calculating unit 11 selects the measured frequencies $f_{Mi}(t)$ measured during the additional mode time intervals Ti based on the measured frequencies f(t) and the corresponding measurement times t provided to it and the additional mode time intervals Ti determined by the calculation unit 11 or provided to the calculation unit 11. Following this, the monitoring performed based on the measured frequencies $f_{Mi}(t)$ measured during the respective additional mode time intervals Ti is preferably performed in the same way as described above with respect to the measured frequencies $f_{M1}(t)$ measured during the first time intervals T1. As an option, for at least one of the additional modes Mi, the monitoring preferably comprises the step of based on the measured frequencies $f_{Mi}(t)$ measured during at least one additional mode time interval Ti, during which the piping system was operated in the respective additional mode Mi, for at least one of the objects $O_J$ at least once determining at least one of the monitoring results by performing at least one of the steps of:

a) determining and providing a degree of impairment of the respective object $O_J$, b) detecting and indicating an impairment of the respective object $O_J$ when the degree of impairment of the respective object $O_J$ exceeds a given threshold fw, c) issuing an alarm when the degree of impairment of the respective object $O_J$ exceeds a given threshold fa, d) determining and providing accretion as impairment cause when the measured frequencies $f_{Mi}(t)$ measured during the additional mode time intervals Ti decrease over time, e) determining and providing corrosion or abrasion as impairment cause when the measured frequencies $f_{Mi}(t)$ measured during the additional mode time intervals Ti increase over time, and f) determining and providing a remaining time RT remaining until the degree of impairment of the respective object $O_J$ will exceed a given threshold fa.

Again, at least one preferably all of these monitoring results a) to f) are preferably issued, indicated or provided via the corresponding output $MR_{Out}$ of the monitoring system.

Additionally monitoring the condition of at least one of the objects $O_J$ based on the measured frequencies $f_{Mi}(t)$ measured during at least one additional mode time interval Ti has the advantage, that it increases the time range, during which measured frequencies $f_{M1}(t)$, $f_{Mi}(t)$ based on which the monitoring can be performed are available. Thus, monitoring results, like e.g. the degree of impairment, the remaining time RT, as well the detection of impairments exceeding the given threshold fw, fa can be determined more frequently and/or updated more regularly.

As an additional option, at least once a first degree of impairment determined at a first time based on the measured frequencies $f_{M1}(t)$ measured during at least one of the first time intervals Ti is preferably compared to a second degree of impairment determined at a second time based on the measured frequencies $f_{Mi}(t)$ measured during at least one of the additional mode time intervals Ti. Here, the first degree of impairment and the second degree of impairment are either both degrees of impairment of the oscillatory element 5 or both degrees of impairment of the same object $O_J$ determined as described above. Based on the comparison, a notification indicating an impaired monitoring capability of the monitoring method and/or the monitoring system is issued when the time difference between the first time and the second time is smaller than a given reference value and the deviation between the first degree of impairment and the second degree of impairment exceeds a predetermined threshold.

As an option, the monitoring system preferably comprises at least one sensor measuring at least one variable that has an effect on the resonance frequency of the oscillatory element 5. As examples, FIGS. 1 to 3 show a temperature sensor 19 measuring a temperature T(t) the oscillatory element 5 is exposed to and a pressure sensor 21 measuring a pressure p(t) inside the pipe 1. As an option, the temperature sensor 19 is e.g. integrated in the oscillatory device 3 and the pressure sensor 21 is e.g. a separate sensor installed on the pipe 1. The measured variables p(t), T(t) measured by the sensors 19, 21 are preferably applied to compensate a dependency of the measured frequencies f(t) measured by the vibratory device 3 on the respective variable p(t), T(t). These compensations are preferably performed based on calibration data determined for the vibratory device 3 representing a dependency of the measured frequency f(t) on the respective variable p(t), T(t). They are e.g. performed by the measurement unit 9 of the vibratory device 3 connected to the respective sensor 19, 21, or by the super-ordinated unit 13, the edge device 15 or the calculating unit 11 provided with the measured frequencies f(t) and the measured variables p(t), T(t). In this case, the compensated measured frequencies are applied as measured frequencies f(t) throughout the monitoring method.

To take further advantage of the method, when corrosion or abrasion has been determined as impairment cause the monitoring results are preferably applied to schedule a replacement of at least one of the monitored objects $O_J$ affected by abrasion or corrosion according to the degree of impairment and/or the remaining time RT determined and provided by the monitoring system and/or the monitoring method for the respective object $O_J$. In this case the object $O_J$ is preferably replaced as scheduled. Further, the vibratory device 3 or at least the oscillatory element 5 is preferably replaced at the same time and the monitoring method is preferably resumed or restarted after the replacement.

As a further option, when accretion has been determined as impairment cause the monitoring results are preferably applied to schedule a cleaning according to the degree of impairment and/or the remaining time RT determined and provided by the monitoring system and/or the monitoring method for at least one of the monitored objects $O_J$. Here the degree of impairment as well as the remaining time RT provide the advantage, that the cleaning can be scheduled to be performed and preferably also be performed in due time before an accretion layer building up on the respective object $O_J$ becomes too thick or too hard to be easily removed.

Depending on the type(s) of object(s) $O_J$ to be cleaned, cleaning is e.g. be performed by removing the respective object(s) $O_J$ from the piping system to be cleaned individually outside the piping system. As an additional or alternative option the pipe 1 is preferably cleaned. Cleaning of the pipe 1 is e.g. performed by rinsing or flushing the pipe 1 with a cleaning agent, like e.g. hot steam or a liquid, like e.g. hot water or a liquid comprising a detergent or a solvent. In this case the operation modes preferably comprise a cleaning mode, during which the cleaning agent is flowing through the pipe 1. Cleaning of the pipe 1 is preferably performed whilst the object(s) $O_J$ and the oscillatory element 5 remain in place on the piping system. To this extent cleaning methods known under the name Cleaning-in-Place (CIP) can be applied. This has the advantage, that during cleaning of the pipe 1, the oscillatory element 5 is cleaned in the same way as the surface(s) of the object(s) $O_J$. Thus, the monitoring method is preferably resumed or restarted after each cleaning of the pipe 1, during which the object(s) $O_J$ and the oscillatory element 5 were cleaned. The monitoring method is preferably resumed when the condition of the oscillatory element 5 after the cleaning is approximately identical to the condition it was in at the beginning of the monitoring method and preferably restarted from the beginning, when the condition of the oscillatory element 5 differs from the condition it was in at the beginning of the monitoring method.

As an option, cleaning time intervals Tc, during which the piping system is operated in the cleaning mode are preferably either provided to the calculating unit 11 or the calculation unit 11 is embodied to determine the cleaning time intervals Tc based on the measured frequencies f(t) and corresponding measurement times t provided to it. In the latter case, the calculating unit 11 is preferably trained or designed to learn the determination of the cleaning time intervals Tc based on the measured frequencies f(t) and the measuring times t provided to it. To this extent, the determination methods described above with respect to the determination of the first time intervals T1 and the additional mode time intervals Ti are preferably applied.

As an option, the method preferably comprises the additional step of at least once cleaning the pipe 1, e.g. by operating the piping system in the cleaning mode, and following this, determining and providing an indicator indicative of an effectiveness of the cleaning. This indicator is preferably determined based on or as a difference between or a quotient of a first degree of impairment determined based on measured frequencies f(t) measured before the respective cleaning of the pipe 1 and a second degree of impairment determined based on measured frequencies f(t) measured after the respective cleaning of the pipe 1. Here the first degree of impairment and the second degree of impairment are either both degrees of impairment of the oscillatory element 5 or both degrees of impairment of the same object $O_J$.

As an option, preferably only applied when conditions inside the pipe 1 can be considered to be fairly stable during the cleaning mode, the cleaning mode can be applied as the first mode instead of the first operation mode or the pause mode mentioned above. In this case the first medium is given by the cleaning agent filling the pipe 1 and/or flowing through the pipe 1 during the cleaning mode. In this case, as on option the indicator indicative of the effectiveness of the cleaning is preferably determined according to the method described above, wherein the first degree of impairment and the second degree of impairment are each determined based on measured frequencies f(t) measured during the same one of the additional modes Mi.

The method according to the present disclosure is preferably performed as a computer implemented method. In that case, the monitoring of the condition of the object(s) $O_J$ based on the measured frequencies f(t) measured by the vibratory device 5 and the corresponding measurement times t is performed by the calculating unit 11 by means of a computer program SW. Thus the present disclosure is also realized in form of a computer program SW comprising instructions which, when the program is executed by a computer, cause the computer to carry out the method according to the present disclosure as described above. In addition, the present disclosure further comprises a computer program product comprising the computer program described above and at least one computer readable medium, wherein at least the computer program is stored on the computer readable medium. The method, the computer program SW and the computer program product each provide the advantages of the method mentioned above.

The invention claimed is:

1. A method of monitoring a condition of an object included in a piping system for transporting at least one product, wherein:
  the piping system includes a pipe transporting the at least one product,
  the object includes a surface exposed to the at least one product flowing through the pipe,
  due to the exposure of the surface to the at least one product the object is susceptible to an impairment caused by at least one of: accretion, abrasion and corrosion, and
  the piping system is operable in a first mode, wherein the pipe is filled with a first medium, the method comprising:
  continuously or repeatedly measuring a resonance frequency of an oscillatory element of a vibratory device installed on the pipe, wherein:

the oscillatory element extends into the pipe and exhibits a susceptibility to an impairment caused by at least one of: accretion, abrasion and corrosion corresponding to the susceptibility of the object, the vibratory device includes a transducer causing the oscillatory element to oscillate at the resonance frequency and a measurement unit measuring the resonance frequency, and the resonance frequency is reduced by accretion and increased by corrosion and by abrasion of the oscillatory element;

providing the measured resonance frequencies and corresponding measurement times to a calculating unit;

determining, via the calculating unit, at least one first time interval during which the piping system is operated in the first mode and the oscillatory element is immersed in the first medium, wherein the determining of the at least one first time interval is based on the measured resonance frequencies and the corresponding measurement times; and monitoring the condition of the object based on the measured resonance frequencies measured during the at least one first time interval and determining and providing a monitoring result.

2. The method according to claim 1, wherein the step of determining and providing the monitoring result includes at least one of the steps of:

determining and providing a degree of impairment of the object, detecting and indicating an impairment of the object when the degree of impairment of the object exceeds a given threshold, issuing an alarm when the degree of impairment of the object exceeds a given threshold, determining and providing accretion as impairment cause when the measured frequencies measured during the first time intervals decrease over time, determining and providing corrosion or abrasion as impairment cause when the measured frequencies measured during the first time intervals increase over time, and determining and providing a remaining time remaining until the degree of impairment the object will exceed a given threshold.

3. The method according to claim 1, wherein the piping system is operable in the first mode and operable in an additional mode, wherein the oscillatory element is immersed in a mode-specific product flowing through the pipe during the additional mode, the method further comprising:

determining via the calculating unit at least one additional mode time interval during which the piping system is operating in the additional mode, wherein the determining of the at least one additional mode time interval is based on a previously determined or learned model for the determination of the at least one additional mode time interval;

based on the measured frequencies measured during the at least one additional mode time interval during which the piping system was operated in the additional mode, performing at least one of the steps of:

monitoring the condition of the object and determining and providing an additional monitoring result, determining and providing a degree of impairment of the object, detecting and indicating an impairment of the object when the degree of impairment of the object exceeds a given threshold, issuing an alarm when the degree of impairment of the object exceeds a given threshold, determining and providing accretion as impairment cause when the measured frequencies measured during the additional mode time intervals decrease over time, determining and providing corrosion or abrasion as impairment cause when the measured frequencies measured during the additional mode time intervals increase over time, and determining and providing a remaining time remaining until the degree of impairment of the object will exceed a given threshold.

4. The method according to claim 3, further comprising:

at a first time determining a first degree of impairment based on the measured frequencies measured during the at least one first time interval;

at a second time determining a second degree of impairment based on measured frequencies measured during the at least one additional mode time interval, wherein the first degree of impairment and the second degree of impairment are either both degrees of impairment of the oscillatory element or both degrees of impairment of the object; and issuing a notification indicating an impaired monitoring capability of the monitoring method when the time difference between the first time and the second time is smaller than a given reference value and a deviation between the first degree of impairment and the second degree of impairment exceeds a predetermined threshold.

5. The method according to claim 1, further comprising at least one of the steps of:

by means of at least one sensor, measuring at least one variable having an effect on the resonance frequency of the oscillatory element, by means of a temperature sensor, measuring a variable given by a temperature the oscillatory element is exposed to, and by means of a pressure sensor, measuring a variable given by a pressure inside the pipe, and the method further comprising the steps of:

based on at least one of the measured variables, performing a compensation of a dependency of the measured frequencies measured by the vibratory device on the respective variable, and applying the compensated measured frequencies as measured frequencies throughout the monitoring method.

6. The method according to claim 2, further comprising at least one of the steps of:

scheduling or scheduling and performing a replacement of the object according to the degree of impairment and/or the remaining time determined and provided by the monitoring method for the respective object when corrosion or abrasion has been determined as impairment cause, performing a replacement, wherein the object and the vibratory device or at least the oscillatory element are replaced and resuming or restarting the monitoring method after the replacement, scheduling or scheduling and performing a cleaning of the object or a cleaning of the pipe performed whilst the object remains on the piping system according to the degree of impairment and/or the remaining time determined and provided by the monitoring method when accretion has been determined as impairment cause; and during a cleaning time interval cleaning the pipe whilst the object and the vibratory device including the oscillatory element extending into the pipe remain in place and performing at least one of:
　resuming or restarting the monitoring method after the pipe has been cleaned, and
　determining and providing an indicator indicative of an effectiveness of the cleaning.

7. The method according to claim 2, further comprising at least one of the steps of:
　during a cleaning time interval cleaning the pipe whilst the object and the vibratory device including the oscillatory element extending into the pipe remain in place; and
　determining and providing an indicator indicative of an effectiveness of the cleaning based on or as a difference between or a quotient of a first degree of impairment determined based on measured frequencies measured before the cleaning of the pipe was performed and a second degree of impairment determined based on measured frequencies measured after the cleaning of the pipe was performed, wherein the first degree of impairment and the second degree of impairment are either both degrees of impairment of the oscillatory element or both degrees of impairment of the object.

8. The method according to claim 1, wherein:
　the model is determined based on training data including measured frequencies and corresponding measurement times including measured frequencies measured during the at least one first time interval during which the piping system was operated in the first mode and the oscillatory element of the vibratory device or an identical oscillatory element of a vibratory device of the same type was immersed in the first medium,
　the training data additionally includes the at least one first time interval, and
　the model is determined or learned based on model inputs given by the measured frequencies and the corresponding measurement times, and model outputs given by the at least one first time interval, both comprised in the training data.

9. The method according to claim 1, further comprising:
　determining the model based on measured frequencies and corresponding measurement times measured during a preliminary time interval during which the piping system was operated in at least two different modes including the first mode by:
　　recording the measured frequencies measured during the preliminary time interval,
　　determining filtered frequencies by applying a filter to the recorded frequencies,
　　determining changing times when the operation mode of the piping system was changed, wherein the changing times are either determined based on the filtered frequencies or determined by determining a time derivative of the filtered frequencies and determining the changing times to each be equal to a peak or valley time at which the time derivative exhibits an extremum or an extremum exceeding a given threshold, a threshold determined based on an outlier detection performed based on the time derivative of the filtered frequencies or a threshold larger than a noise superimposed on the filtered frequencies,
　　based on the changing times, identifying time intervals during which the piping system was operated in a single operation mode,
　　for each of these time intervals, either determining a set of at least one statistical property; the at least one statistical property including at least one of: at least one property of the measured frequencies measured during the respective time interval and at least one property of the filtered frequencies measured during the respective time interval, or determining a set of at least one statistical property including at least one of: an average of the measured frequencies measured during the respective time interval, an average of the filtered frequencies measured during the respective time interval, a standard deviation or variance of the measured frequencies measured during the respective time interval and a standard deviation or variance the filtered frequencies measured during the respective time interval,
　　based on the sets of statistical properties determined for each of the time intervals, identifying those time intervals during which the piping system was operated in the same operation mode,
　　determining one of the operation modes identified and identifiable based on the corresponding set of statistical properties as the first mode applied to perform the monitoring, and
　during monitoring determining the first time intervals based on the set of statistical properties representative of the first mode, by:
　　recording the measured frequencies and the corresponding measurement times and filtering the recorded frequencies,
　　determining changing times that occurred during monitoring or determined changing times that occurred during monitoring to each be equal a peak or valley time at which a time derivative of the filtered frequencies exhibits an extremum,
　　based on the changing times identifying time intervals during which the piping system was operated in a single operation mode,
　　for each of these time intervals determining the set of statistical properties of the measured frequencies and/or the filtered frequencies measured during the respective time interval, and
　　comparing the sets of statistical properties to the set of statistical properties representative of the first mode and based on this comparison identifying sets of statistical properties corresponding to the set of statistical properties representative of the first mode and identifying the corresponding time intervals as first time intervals.

10. The method according to claim 1, further comprising:
　at least once providing a cleaning time interval during which the pipe was cleaned to the calculation or by means of the calculating unit at least once determining a cleaning time interval during which the pipe was cleaned by performing a determination method corresponding to a determination method applied by the calculation unit to determine the at least one first time interval.

11. The method according to claim 1, further:
　predetermining the first mode to be given by a first operation mode during which a first product is flowing through the pipe, to be given by a pause mode during which no product is flowing through the pipe and the empty pipe is filled with air or a gas, or to be given by a cleaning mode during which the cleaning agent is flowing through the pipe.

12. The method according to claim 1, further comprising:
determining a quantitative relation representing the correspondence between the susceptibility of the object and the susceptibility of the oscillating element and applying this quantitative relation to monitor the condition of the object based on the measured frequencies indicative of the condition of the oscillatory element,
wherein the quantitative relation is either determined based on the at least one product and the material of the exposed surface of the object and of the oscillating element, or determined based on the at least one product and the material of the exposed surface of the object and of the oscillating element and at least one of: a property of the surface, a surface-shape of the surface, a surface-roughness of the surface, a position the surface of the object inside the pipe and a position the surface of the object in relation to the pipe.

13. The method according to claim 1, further comprising:
based on a relationship between a degree of impairment of the oscillatory element and a frequency change of the resonance frequency caused by a change of an oscillating mass of the oscillating element caused by the degree of impairment, setting a threshold for a degree of impairment of the object according to a corresponding threshold value for the change of the oscillating mass, wherein the threshold value for the change of the oscillating mass is either a default value defined based on the material and the design of the oscillatory element and the correspondence of or a quantitative relation between the susceptibility of the oscillatory element and the susceptibility of the object or determined additionally based on a property or a density of at least one of the products causing accretion.

14. The method according to claim 1, wherein:
the first mode is: a) a first operation mode during which the first medium given by a first product of the at least one products to be transported by the piping system is flowing through said pipe, b) a pause mode, during which no product is flowing through the pipe, wherein said first medium is given by air or another gas filling the pipe during the pause mode, or c) a cleaning mode, during which the pipe is filled with a cleaning agent or filled with a cleaning agent flowing through the pipe.

15. The method according to claim 2, wherein:
the degree of impairment of the object is determined at least once, continuously, or repeatedly based on a comparison of at least one property and/or an average of measured frequencies comprised in a first set of measurement data comprising most recently measured frequencies each measured during one of the first time intervals and a reference value predetermined for the property.

16. The method according to claim 2, wherein:
the remaining time is determined based on the measured frequencies and the corresponding measuring times at least once, continuously, or repeatedly:
by means of a time series prediction method and/or by means of a linear or non-liner extrapolation method performed based on the frequencies measured during the first intervals,
by repeatedly determining the degree of impairment of the object over a time period, during which the degree of impairment can be expected to change, determining a rate of change of these degrees of impairment, and by determining said remaining time based on the present degree of impairment and said rate of change, and/or
by providing the measured frequencies and the corresponding measurement times to a calculating unit performing the determination of the remaining time, wherein the calculating unit is embodied to determine the remaining time based on the measured frequencies and the measuring times provided to it and a model for determining the remaining time, wherein the model is either a previously determined model stored in a memory of the calculation unit or a model learned by the calculating unit designed to learn the model based on the measured frequencies and the measuring times provided to it.

17. The method according to claim 1, wherein the object is:
an object given by an inside wall of the pipe,
an object given by a valve installed on the pipe,
an object given by a thermowell installed on the pipe,
an object given by a compensator connected to the pipe, or
an object given by a sensor, a pump, an aggregate or a device,
having at least one surface exposed to the product(s) flowing through the pipe.

18. The method according to claim 1, wherein:
an additional object is included in the piping system;
the object includes a surface exposed to the product(s) flowing through the pipe,
due to the exposure of the surface to said product(s) the additional object is susceptible to an impairment caused by at least one of: accretion, abrasion and corrosion, and
the method includes the step of: monitoring the condition of the additional object based on the measured frequencies measured during at least one first time interval during which the piping system was operated in the first mode and the oscillatory element was immersed in the first medium and determining and providing a monitoring result for the additional object.

19. A monitoring system for monitoring a condition of an object in a piping system for transporting at least one product, wherein the piping system includes a pipe transporting the at least one product and the piping system is operable in a first mode in which the pipe is filled with a first medium, and wherein the object includes at least one surface exposed to the at least one product flowing through the pipe and the object is susceptible to an impairment caused by at least one of: accretion, abrasion, and corrosion due to the exposure of the at least one surface to the at least one product, the monitoring system comprising:
a vibratory device installed on a pipe, the vibratory device including:
an oscillatory element extending into the pipe and exhibiting a susceptibility to an impairment caused by at least one of: accretion, abrasion, and corrosion corresponding to a susceptibility of the object;
a transducer configured to cause the oscillatory element to oscillate at a resonance frequency; and
a measurement unit configured to measure the resonance frequency; and
a calculation unit directly or indirectly connected to or communicating with the vibratory device,
wherein the calculation unit is embodied to perform the monitoring based on the measured resonance frequencies measured by the vibratory device and corresponding measurement times provided to the calculating unit, wherein the monitoring includes:

determining, based on the measured resonance frequencies and the corresponding measurement times, at least one first time interval during which the piping system was operated in the first mode and the oscillatory element was immersed in the first medium, and monitoring the condition of the object based on the measured frequencies measured during the at least one first time interval and determining and providing a monitoring result, wherein the calculating unit is trained or designed to learn the determination of the at least one first time interval based on the measured resonance frequencies and the corresponding measurement times.

20. A computer program comprising instructions which, when the program is executed by a computer, monitor a condition of at least one object in a piping system for transporting at least one product, wherein the piping system includes a pipe transporting the at least one product, the at least one object includes at least one surface exposed to the at least one product flowing through the pipe, the at least one object is susceptible to an impairment caused by at least one of: accretion, abrasion, and corrosion due to the exposure of the at least one surface to the at least one product, and the piping system is operable in a first mode in which the pipe is filled with a first medium, the monitoring comprising the steps of:

continuously or repeatedly measuring a resonance frequency of an oscillatory element of a vibratory device installed on the pipe, wherein:

the oscillatory element extends into the pipe and exhibits a susceptibility to an impairment caused by accretion, abrasion, and/or corrosion corresponding to the respective susceptibilities of said the at least one object, the vibratory device includes a transducer causing the oscillatory element to oscillate at the resonance frequency and a measurement unit measuring the resonance frequency, and the resonance frequency is reduced by accretion and increased by corrosion and by abrasion of the oscillatory element;

determining, based on the measured resonance frequencies and the corresponding measurement times, at least one first time interval during which the piping system was operated in the first mode and the oscillatory element was immersed in the first medium, wherein the determining of the at least one first time interval is further based on a previously determined or learned model for the determination of the at least one first time interval;

monitoring the condition of the at least one object based on the measured resonance frequencies measured during the at least one first time interval; and determining and providing at least one monitoring result.

* * * * *